A. L. HOLCOMB.
Corn Planter.
No. 104,591.
Patented June 21, 1870.
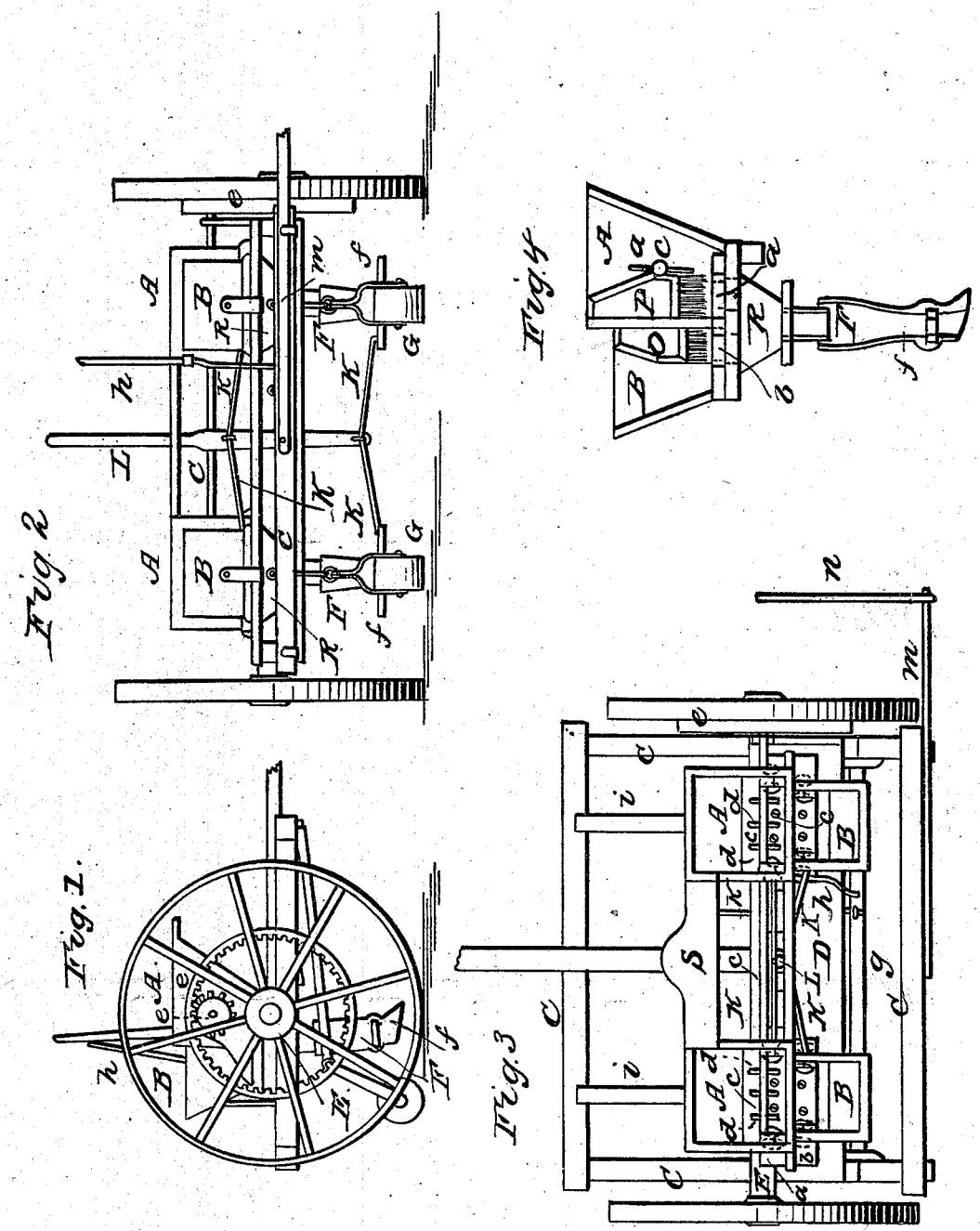
WITNESSES
INVENTOR

United States Patent Office.

ANDREW L. HOLCOMB, OF HOPEWELL, NEW JERSEY.

Letters Patent No. 104,591, dated June 21, 1870.

IMPROVEMENT IN CORN-PLANTER AND FERTILIZER.

The Schedule referred to in these Letters Patent and making part of the same.

*To all whom it may concern:*

Be it known that I, ANDREW L. HOLCOMB, of Hopewell, in the county of Mercer and State of New Jersey, have invented a new and improved Corn-Planter and Fertilizer; and I do hereby declare that the following is a full, clear, and exact description of the same, reference being had to the accompanying drawing and to the letters of reference marked thereon.

Figure 1 represents a side view of my machine.

Figure 2, a rear view.

Figure 3, a plan.

Figure 4, a sectional view of the boxes and tube, showing the internal arrangement of my device.

The object of my improvement is to deposit a sufficient amount of fertilizer and plant two rows of corn at the same time, with the requisite number of grains in each hill, by moving the machine at right angles to the furrows already made, to be drawn by horse or other power.

To enable others to make use of my invention, I will proceed to describe the same.

It is constructed of a square frame, as shown by C in fig. 3, attached to the bottom of the axle E, with the board D placed horizontally to the axle, for the slides or valves to work upon, having small holes cut therein at proper distances apart, for the contents of the thimbles in the slides to drop through.

A and B are boxes, placed two at each side of the machine over the slides $a$ and $b$.

The boxes A are intended to contain the fertilizer, and the rod $c$ with the pins $d$ running through the center thereof, and connecting with the internal gearing $e\ e$, is intended to keep the fertilizer constantly stirred up, so that the thimble will not clog.

The boxes B are smaller than the boxes A, and hold the corn or grain.

The slide $b$ consists of a flat piece of cast-iron, with a thimble at each end, so constructed with a movable slide on one side of the thimble, and held by a screw, as to open or close, in order to regulate the number of grains required in each hill.

The slide $a$, for the fertilizing-box A, is constructed in the same way as the slide $b$, with the exception of being larger.

The tubes or drills F are made of cast-iron, and tipped with steel, and a hole or slot near the ground, for the slide $f$ to work through.

The slide $f$ is composed of a flat piece of wrought iron, with a hole through the center a little larger than the one in the tube. This slide, when closed, retains the corn and fertilizer in the tube which has been dropped from the upper thimbles, until the operator wishes to deposit them in the hill.

The tubes F are connected with the front of the frame C by iron rods. A roller, G, is attached to each tube, with either a flat or concave periphery, for the purpose of leveling the earth after the grain and fertilizer have been deposited.

The tubes and rollers are connected, by chains, with the cross-beam $g$, to which is attached the lever $h$, for the purpose of raising the tubes and rollers clear of the ground when turning, or otherwise not in use.

The beam $g$ is also connected, by a chain, with a rod in front of the axle, at each end of which is a weight attached beneath the beam $i\ i$, for the purpose, when the tubes are down, of keeping them at the required depth.

The slides $a$, $b$, and $f$ are worked by means of the connecting-rods K, attached to the main lever L, which, working on a pivot in an arm running down from the center of the axle, imparts the proper movement to the slides. When the hole in the lower slide, $f$, is opposite the hole in the tube, the upper slides are both closed, and *vice versa*.

O and P, fig. 4, represent brushes, placed at each end of each box, for the purpose of sweeping the thimbles off evenly.

R, same figure, represents the box or hopper, which conveys the grain and fertilizer into the tube F.

M and N, fig. 3, represent a guide or marker, attached to the frame C, the end of the arm N, just reaching the center of the axle, shows the operator when to move the slides, in order to drop the grain in its proper hill. This marker can be shifted to either side of the machine, at his option, by simply turning it over.

S, in same figure, shows the driver's seat, the operator sitting behind on one of the corn-boxes.

Having thus fully described my invention,

What I claim as new, and desire to secure by Letters Patent, is—

1. The combination of the hoppers A B, brushes O P, stirrer $c$, with the slides $a$, $b$, and $f$, dropping-box R, lever L, and rods K, substantially as described, and for the purpose set forth.

2. The marker M N, frame C, rollers G, chains and lever $h$, rock-shaft $g$, when arranged and constructed as herein set forth, for the purposes described.

In testimony whereof I have signed my name to this specification in the presence of two subscribing witnesses.

ANDREW L. HOLCOMB.

Witnesses:
J. H. BLACKWELL,
I. V. D. JOLINE.